United States Patent
Norman

(10) Patent No.: US 7,382,772 B1
(45) Date of Patent: Jun. 3, 2008

(54) COMMUNICATION SYSTEM THAT SHARES PROTECT LINKS AMONG MULTIPLE SERVICES INCLUDING AN INTERNET SERVICE

(75) Inventor: Charles W. Norman, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1188 days.

(21) Appl. No.: 10/647,928

(22) Filed: Aug. 26, 2003

(51) Int. Cl.
*H04L 12/66* (2006.01)
*G01R 31/08* (2006.01)

(52) U.S. Cl. .................... 370/352; 370/217; 370/225; 370/228; 379/9.05

(58) Field of Classification Search ........ 370/216–220, 370/225–228, 230.1, 236, 248, 242–244, 370/250, 352, 254–256; 379/1.01, 9.05, 379/14.01, 15.01, 32.01, 219, 220.01

See application file for complete search history.

(56) References Cited

U.S. PATENT DOCUMENTS

| | | | | |
|---|---|---|---|---|
| 5,509,065 A | * | 4/1996 | Fitzgerald | 379/279 |
| 5,515,429 A | * | 5/1996 | Kawada et al. | 379/279 |
| 5,577,096 A | * | 11/1996 | Kitano et al. | 379/2 |
| 5,859,895 A | * | 1/1999 | Pomp et al. | 379/9.05 |
| 6,356,622 B1 | * | 3/2002 | Hassell et al. | 379/1.01 |
| 2008/0002669 A1 | * | 1/2008 | O'Brien et al. | 370/352 |

* cited by examiner

*Primary Examiner*—Binh K. Tieu

(57) ABSTRACT

A first optical interface is coupled to a first IP service node and a first non-IP service node. A second optical interface is coupled to a second IP service node and a second non-IP service node. The first optical interface is coupled to the second optical interface by a first working link for the IP service nodes and by a second working link for the non-IP service nodes. The first optical interface is coupled to the second optical interface by a shared protect link. The first optical interface and the second optical interface replace either of the first working link or the second working link with the shared protect link.

14 Claims, 3 Drawing Sheets

FIG. 1 — PRIOR ART

COMMUNICATION SYSTEM THAT SHARES PROTECT LINKS AMONG MULTIPLE SERVICES INCLUDING AN INTERNET SERVICE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to the use of shared protect links for the back-up operations of multiple communication services.

2. Description of the Prior Art

Internet Protocol (IP) communications systems frequently use IP routers that are set-up as matched pairs. If one of the IP routers in the pair fails, then the other IP router in the pair can take over for the failed IP router. In addition, IP routers are connected over two diverse links. If one of the links between two IP routers fails, then the IP routers use the other link.

Since the IP routers and their links must back each other up, they must retain significant excess capacity to perform their back-up role. Unfortunately, this form of back-up protection requires a serious overbuild in IP links and routers. The overbuild results a excess cost and complexity.

SUMMARY OF THE INVENTION

Some examples of the invention include a communication system comprising: a first Internet Protocol (IP) service node and a second IP service node; a first telephony service node and a second telephony service node; a first optical interface and a second optical interface wherein the first optical interface is coupled to the first IP service node and the first telephony service node and the second optical interface is coupled to the second IP service node and the second telephony service node; a first working link coupling the first optical interface to the second optical interface; a second working link coupling the first optical interface to the second optical interface; and a shared protect link coupling the first optical interface to the second optical interface. The first working link is configured to transfer IP traffic between the first IP service node and the second IP service node. The second working link is configured to transfer telephony traffic between the first telephony service node and the second telephony service node. The shared protect link is configured to transfer IP traffic between the first IP service node and the second IP service node or to transfer telephony traffic between the first telephony service node and the second telephony service node. The first optical interface and the second optical interface are configured to replace either of the first working link or the second working link with the shared protect link.

In some variations of these examples, the communication system further comprises a first Asynchronous Transfer Mode (ATM) service node and a second ATM service node wherein the first optical interface is coupled to the first ATM service node and the second optical interface is coupled to the second ATM service node; and a third working link coupling the first optical interface to the second optical interface and configured to transfer ATM traffic between the first ATM service node and the second ATM service node. The first optical interface and the second optical interface are configured to replace the third working link with the shared protect link.

In some variations of these examples, the communication system further comprises a first Ethernet service node and a second Ethernet service node wherein the first optical interface is coupled to the first Ethernet service node and the second optical interface is coupled to the second Ethernet service node; and a third working link coupling the first optical interface to the second optical interface and configured to transfer Ethernet traffic between the first Ethernet service node and the second Ethernet service node. The first optical interface and the second optical interface are configured to replace the third working link with the shared protect link.

In some variations of these examples, the communication system further comprises a first frame relay service node and a second frame relay service node wherein the first optical interface is coupled to the first frame relay service node and the second optical interface is coupled to the second frame relay service node; and a third working link coupling the first optical interface to the second optical interface and configured to transfer frame relay traffic between the first frame relay service node and the second frame relay service node. The first optical interface and the second optical interface are configured to replace the third working link with the shared protect link.

In some variations of these examples, the communication system further comprises a first Storage Area Network (SAN) service node and a second SAN service node wherein the first optical interface is coupled to the first SAN service node and the second optical interface is coupled to the second SAN service node; and a third working link coupling the first optical interface to the second optical interface and configured to transfer SAN traffic between the first SAN service node and the second SAN service node. The first optical interface and the second optical interface are configured to replace the third working link with the shared protect link.

In some variations of these examples, the communication system further comprises a first Multi-Protocol Label Switching (MPLS) service node and a second MPLS service node wherein the first optical interface is coupled to the first MPLS service node and the second optical interface is coupled to the second MPLS service node; and a third working link coupling the first optical interface to the second optical interface and configured to transfer MPLS traffic between the first MPLS service node and the second MPLS service node. The first optical interface and the second optical interface are configured to replace the third working link with the shared protect link.

In some variations of these examples, the first IP service node comprises a first matched IP router pair and the second IP service node comprises a second matched IP router pair.

Some examples of the invention include a communication system comprising: a first Internet Protocol (IP) router and a second IP router wherein the first IP router and the second IP router back-up each other to form a first matched IP router pair; a third IP router and a fourth IP router wherein the third IP router and the fourth IP router back-up each other to form a second matched IP router pair; a first optical interface and a second optical interface; a first working link coupling the first IP router to the first optical interface; a second working link coupling the second IP router to the first optical interface; a third working link coupling the third IP router to the second optical interface; a fourth working link coupling the fourth IP router to the second optical interface; a fifth working link coupling the first optical interface to the second optical interface; a sixth working link coupling the first optical interface to the second optical interface; a first protect link coupling the first IP router to the first optical interface; a second protect link coupling the second IP router to the first optical interface; a third protect link coupling the third IP router to the second optical interface; a fourth protect link coupling the fourth IP router to the second optical interface; a fifth protect link coupling the first optical interface to the second optical interface; and a sixth protect link coupling the first optical interface to the second optical interface. Under normal operation, the first optical interface connects the first working link to the fifth working link and the second optical interface connects the fifth working link to the third working link to form a first working communication path from the first IP router to the third IP router; and the first optical interface connects the second working link to the sixth working link and the second optical interface connects the sixth working link to the fourth working link to form a second working communication path from the second IP router to the fourth IP router. Under a first back-up operation, the first optical interface connects the first working link or the first protect link to the fifth protect link and the second optical interface connects the fifth protect link to the third working link or the third protect link to form a first protect communication path from the first IP router to the third IP router. Under a second back-up operation, the first optical interface connects the second working link or the second protect link to the sixth protect link and the second optical interface connects the sixth protect link to the fourth working link or the fourth protect link to form a second protect communication path from the second IP router to the fourth IP router. Under a third back-up operation, the first optical interface connects a first non-IP service link to the fifth protect link and the second optical interface connects the fifth protect link to a second non-IP service link to form a third protect communication path for a non-IP service. Under a fourth back-up operation, the first optical interface connects a third non-IP service link to the sixth protect link and the second optical interface connects the sixth protect link to a fourth non-IP service link to form a fourth protect communication path for a the non-IP service.

In some variations of these examples, the non-IP service comprises telephony service.

In some variations of these examples, the non-IP service comprises asynchronous transfer mode service.

In some variations of these examples, the non-IP service comprises frame relay service.

In some variations of these examples, the non-IP service comprises Ethernet service.

In some variations of these examples, the non-IP service comprises storage area network service.

In some variations of these examples, the non-IP service comprises storage area network service.

In some variations of these examples, the non-IP service comprises multi-protocol label switching service.

BRIEF DESCRIPTION OF THE DRAWINGS

The same reference number represents the same element on all drawings.

DETAILED DESCRIPTION OF THE PREFERRED EMBODIMENT

Prior Art Communication System

Figure 1:
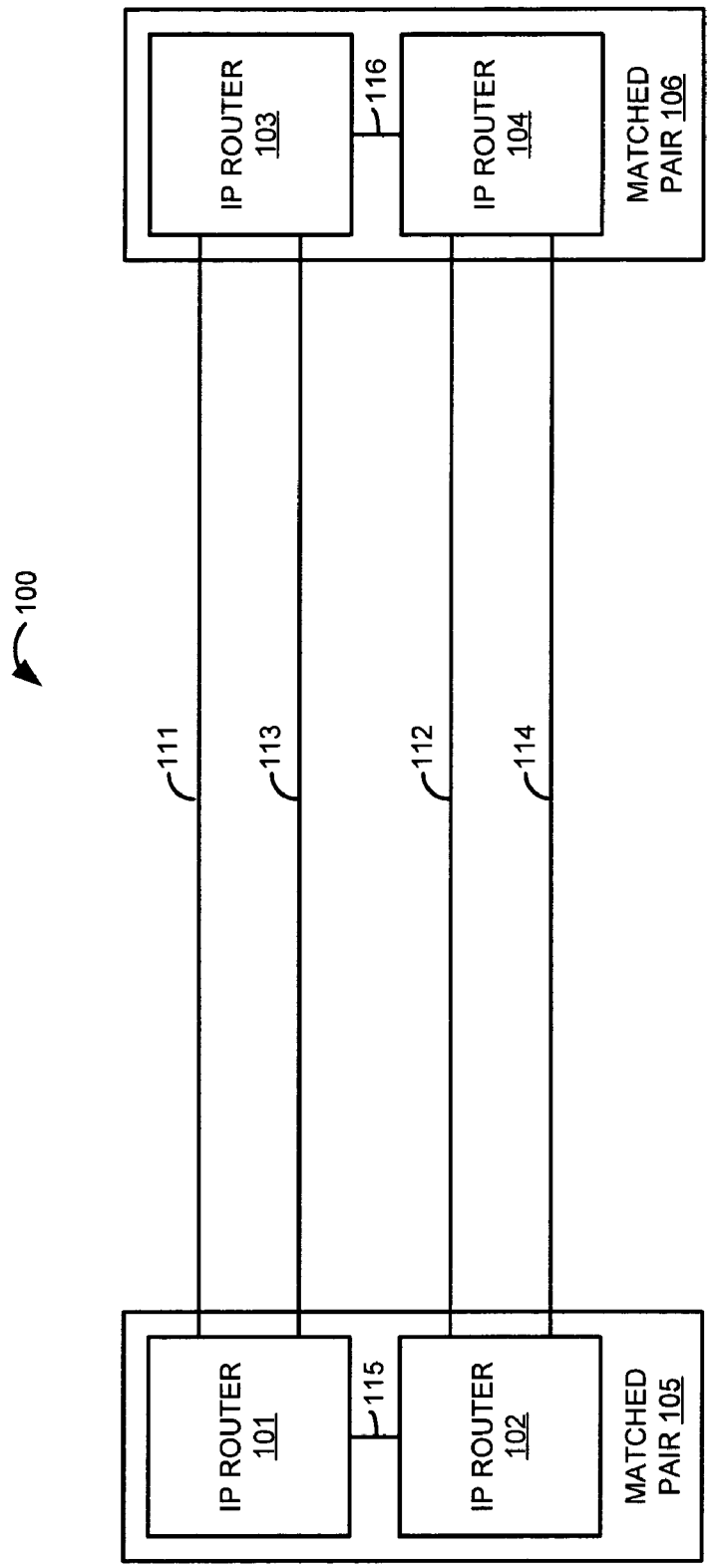
FIG. 1 illustrates a communication system in an example of the prior art.

A brief discussion of a prior communication system is first provided to facilitate a better understanding of the invention. FIG. 1 illustrates communication system 100 in an example of the prior art. Communication system 100 includes IP routers 101-104 and links 111-114. The following table indicates how these elements are linked together.

| LINK | ELEMENT | ELEMENT |
| --- | --- | --- |
| 111 | IP ROUTER 101 | IP ROUTER 103 |
| 112 | IP ROUTER 102 | IP ROUTER 104 |
| 113 | IP ROUTER 101 | IP ROUTER 103 |
| 114 | IP ROUTER 102 | IP ROUTER 104 |
| 115 | IP ROUTER 101 | IP ROUTER 102 |
| 116 | IP ROUTER 103 | IP ROUTER 104 |

IP routers 101-102 back each other up to form matched pair 105, and IP routers 103-104 back each other up to form matched pair 106. For example, if IP router 101 fails, other IP routers will stop transferring IP packets to IP router 101 and begin to transfer IP packets to IP router 102. Likewise, if IP router 102 fails, other IP routers will stop transferring IP packets to IP router 102 and begin to transfer IP packets to IP router 101.

In a similar fashion, links 111 and 113 back each other up, and links 112 and 114 back each other up. For example, if link 111 fails, IP routers 101 and 103 stop transferring IP packets over link 111 and start transferring IP packets over link 113. Likewise, if link 113 fails, IP routers 101 and 103 stop transferring IP packets over link 113 and start transferring IP packets over link 111. Typically, links 111 and 113 follow diverse physical paths.

In order to provide this back-up capability, links 111-114 must retain significant excess capacity to handle the load of a failed companion link. Typically, the load of links 111-114 is capped at 40%. Unfortunately, the 40% cap requires many more links than if a higher loading cap is used. For example, a 40% loading cap requires twice as many links as an 80% loading cap. The additional links add undesired cost and complexity to communication system 100. In addition to caps on links 111-114, routers 101-104 are also capped to 40% of capacity provide the excess capacity needed to handle problems. Other equipment may be capped in a similar fashion.

New Communication System

Figure 2:
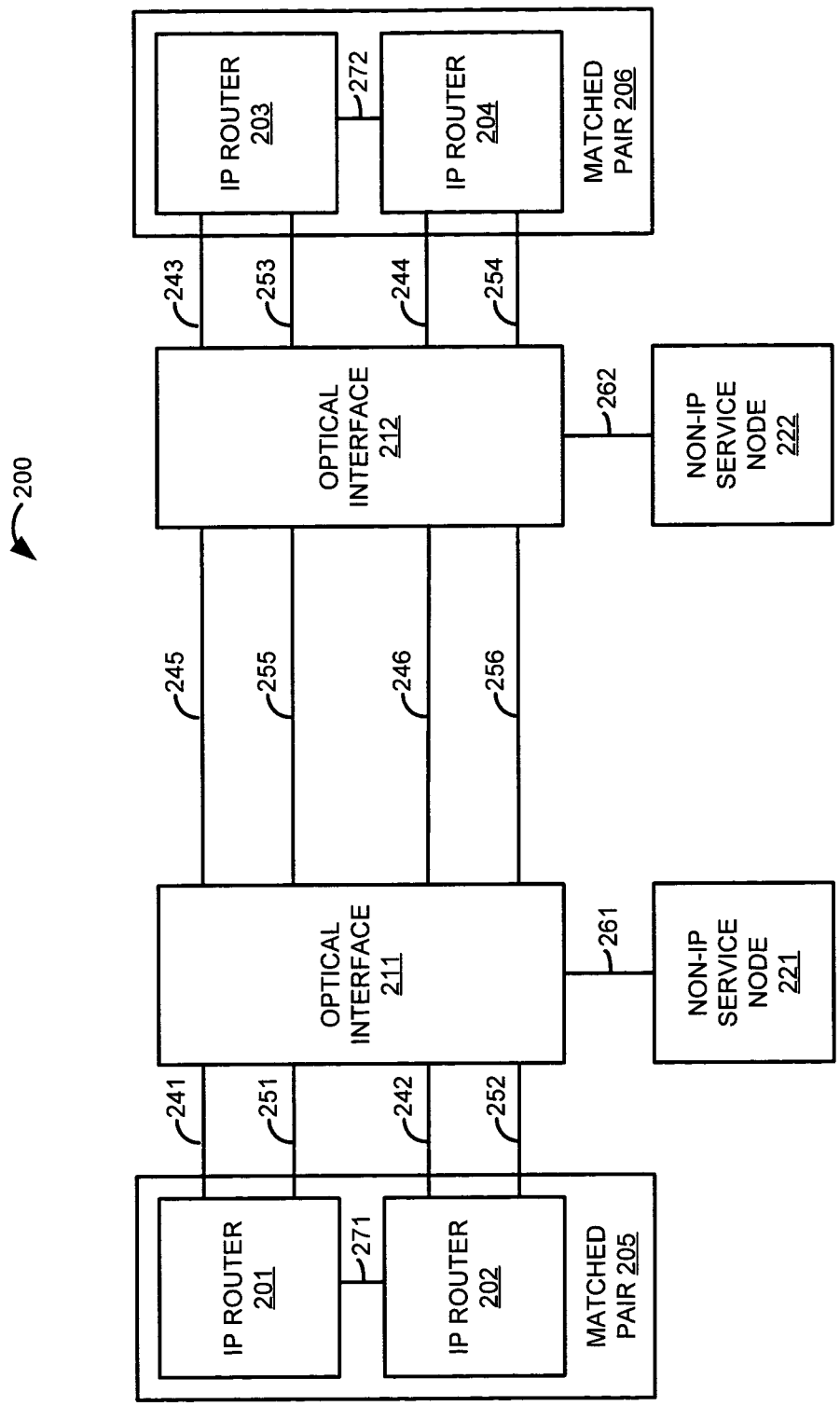
FIG. 2 illustrates a communication system in an example of the invention.
Figure 3:
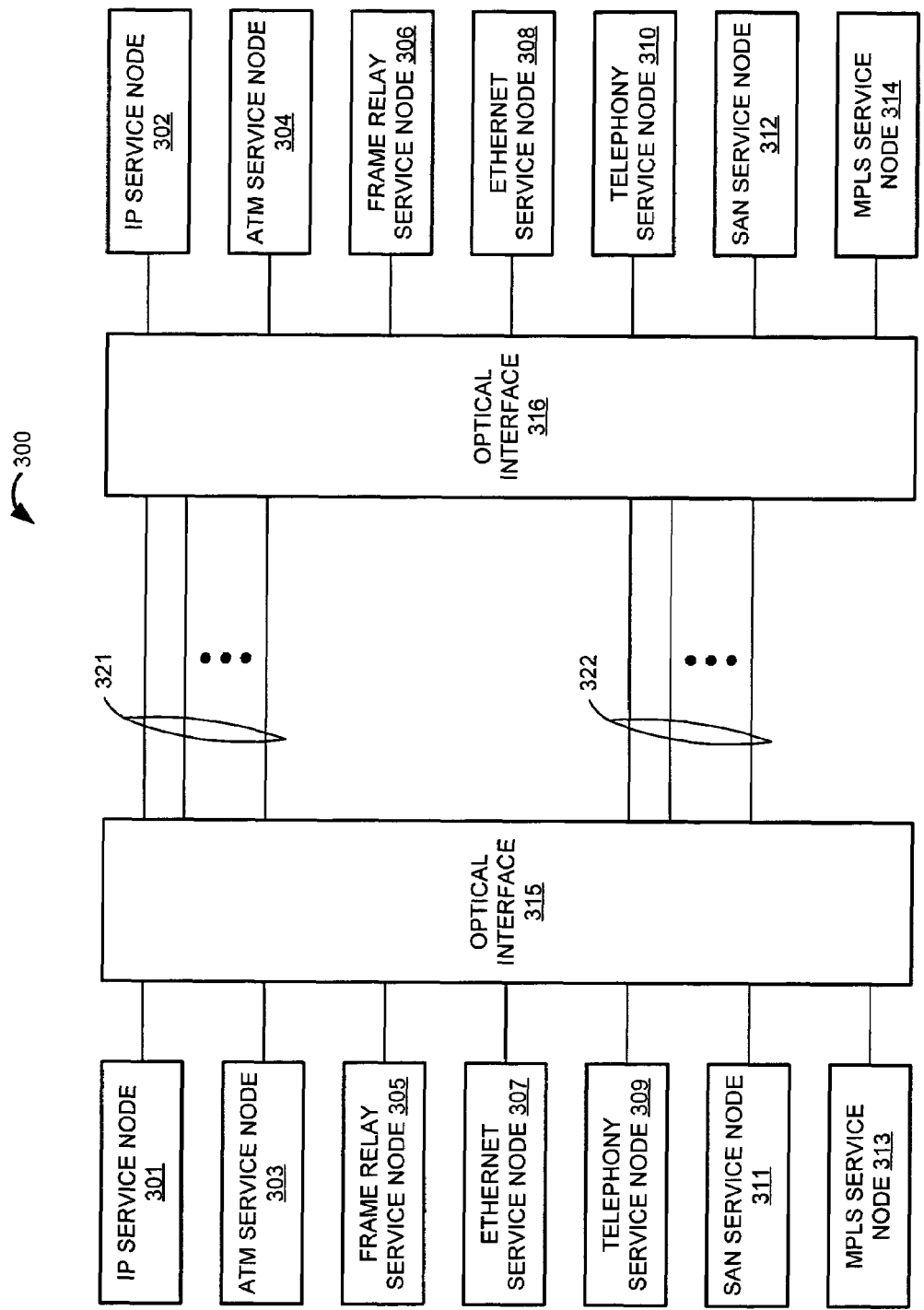
FIG. 3 illustrates a communication system in an example of the invention.

FIGS. 2-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Example #1

FIG. 2 illustrates communication system 200 in an example of the invention. Communication system 200 includes IP routers 201-204, optical interfaces 211-212, non-IP service nodes 221-222, and links 241-246, 251-256, and 261-262. The following table indicates how these elements are linked together.

| LINK | ELEMENT | ELEMENT |
| --- | --- | --- |
| 241 | IP ROUTER 201 | OPTICAL INTERFACE 211 |
| 242 | IP ROUTER 202 | OPTICAL INTERFACE 211 |
| 243 | IP ROUTER 203 | OPTICAL INTERFACE 212 |
| 244 | IP ROUTER 204 | OPTICAL INTERFACE 212 |
| 245 | OPTICAL INTERFACE 211 | OPTICAL INTERFACE 212 |
| 246 | OPTICAL INTERFACE 211 | OPTICAL INTERFACE 212 |
| 251 | IP ROUTER 201 | OPTICAL INTERFACE 211 |
| 252 | IP ROUTER 202 | OPTICAL INTERFACE 211 |
| 253 | IP ROUTER 203 | OPTICAL INTERFACE 212 |
| 254 | IP ROUTER 204 | OPTICAL INTERFACE 212 |
| 255 | OPTICAL INTERFACE 211 | OPTICAL INTERFACE 212 |
| 256 | OPTICAL INTERFACE 211 | OPTICAL INTERFACE 212 |
| 261 | SERVICE NODE 221 | OPTICAL INTERFACE 211 |
| 262 | SERVICE NODE 222 | OPTICAL INTERFACE 212 |
| 271 | IP ROUTER 201 | IP ROUTER 202 |
| 272 | IP ROUTER 203 | IP ROUTER 204 |

IP routers 201-204 could comprise equipment configured to route IP packets. IP routers 201-202 back each other up to form matched pair 205, and IP routers 203-204 back each other up to form matched pair 206. The IP routers in a matched pair each have the same control logic and software so they can take over for the other router in the matched pair. For example, if IP router 201 fails, other IP routers will stop transferring IP packets to IP router 201 and start transferring IP packets to IP router 202. Likewise, if IP router 202 fails, other IP routers will stop transferring IP packets to IP router 202 and start transferring IP packets to IP router 201.

Optical interfaces 211-212 could comprise Synchronous Optical Network (SONET) Add/Drop Multiplexer (ADM) systems, broadband Digital Cross-connect Systems (DCS), Wave Division Multiplexing (WDM) systems, and optical switching systems. Various combinations and sub-combinations of these systems could be used to form optical interfaces 211-212. Each of the optical interface 211-212 could be distributed among multiple interconnected devices or integrated into a single device. For example, optical interface 211 could represent a set of SONET cards that are installed in various IP routers and non-IP devices (making links 241-244 and 251-254 internal to the routers and devices). Alternatively, optical interface 211 could comprise a broadband DCS that integrates the functionality of ADM, cross-connect, and WDM systems.

Non-IP service nodes 221-222 could comprise Asynchronous Transfer Mode (ATM) systems, digital telephony systems (DS1/DS3), frame relay systems, Ethernet systems, Storage Area Network (SAN) systems, Multi-Protocol Label Switching (MPLS) systems, or some other communication systems that do not use IP. For example, non-IP service nodes 221-222 could be long distance telephone switches that exchange voice communications over DS3 connections or frame relay switches that exchange data over frame relay connections.

Links 241-246, 251-256, and 261-262 could comprise optical fibers. Links 241-246 are working links that are used under normal operating conditions. Links 251-256 are protect links that are used under back-up operating conditions. Links 261-262 could be either working or protect links. In some variations, protect links 251-254 could be omitted.

Under normal operating conditions, working links 241-246 can adequately transfer IP packets between IP routers 201-204. The following table indicates the connections made by optical interfaces 211-212 under normal operating conditions.

| OPT. IF | LINK | LINK |
| --- | --- | --- |
| 211 | 241 | 245 |
| 211 | 242 | 246 |
| 212 | 243 | 245 |
| 212 | 244 | 246 |

Thus, IP router 201 exchanges IP packets with IP router 203 over a communication path formed by links 241, 245, and 243; and IP router 202 exchanges IP packets with IP router 204 over a communication path formed by links 242, 246, and 244.

Under some back-up conditions, at least one of working links 241-246 can no longer adequately transfer the IP packets. Inadequate packet transfer could mean a total link failure, an excess level of errors on the link, an excess level of latency on the link, or some other measure of inadequate link performance.

If working link 245 can longer no longer adequately transfer the IP packets, then optical interfaces 211-212 change their connections to replace inadequate working link 245 with protect link 255 as indicated in the following table.

| OPT. IF | LINK | LINK |
| --- | --- | --- |
| 211 | 241 | 255 |
| 212 | 243 | 255 |

Thus, IP router 201 exchanges IP packets with IP router 203 over a communication path formed by links 241, 255, and 243. Alternatively, protect link 251 may be used in place of working link 241, either because working link 241 has previously failed and protect link 251 was already being used or because working link 241 is replaced along with failed link 245. In addition and for similar reasons, protect link 253 may be used in place of working link 243. These alternatives are reflected in the following table where IP router 201 exchanges IP packets with IP router 203 over a communication path formed by links 251, 255, and 253.

| OPT. IF | LINK | LINK |
| --- | --- | --- |
| 211 | 251 | 255 |
| 212 | 253 | 255 |

If working link 246 can longer no longer adequately transfer the IP packets, then optical interfaces 211-212 change their connections to replace inadequate working link 246 with protect link 256 as indicated in the following table.

| OPT. IF | LINK | LINK |
|---------|------|------|
| 211     | 242  | 256  |
| 212     | 244  | 256  |

Thus, IP router 202 exchanges IP packets with IP router 204 over a communication path formed by links 242, 256, and 244. Alternatively, protect link 252 may be used in place of working link 242, either because working link 242 has previously failed and protect link 252 was already being used or because working link 242 is replaced along with failed link 246. In addition and for similar reasons, protect link 254 may be used in place of working link 244. These alternatives are reflected in the following table where IP router 202 exchanges IP packets with IP router 204 over a communication path formed by links 252, 256, and 254.

| OPT. IF | LINK | LINK |
|---------|------|------|
| 211     | 252  | 256  |
| 212     | 254  | 256  |

Under other back-up conditions, at least one working link (not shown) between non-IP service nodes 221-222 may no longer adequately transfer the non-IP traffic. In this situation, optical interfaces 211-212 may change their connections to replace the inadequate working link with protect link 255 as indicated in the following table.

| OPT. IF | LINK | LINK |
|---------|------|------|
| 211     | 261  | 255  |
| 212     | 262  | 255  |

Thus, non-IP service node 221 exchanges non-IP traffic with non-IP service node 222 over a communication path formed by links 261, 255, and 262. Alternatively, protect link 256 may be used instead of protect link 255, and as indicated in the following table, non-IP service node 221 exchanges non-IP traffic with non-IP service node 222 over a communication path formed by links 261, 256, and 262.

| OPT. IF | LINK | LINK |
|---------|------|------|
| 211     | 261  | 256  |
| 212     | 262  | 256  |

Example #2

FIG. 3 illustrates communication system 300 in an example of the invention. Communication system 300 includes optical interfaces 315-316, working links 321, and protect links 322. Optical interface 315 is coupled to IP service node 301, ATM service node 303, frame relay service node 305, Ethernet service node 307, telephony service node 309, Storage Area Network (SAN) service node 311, and Multi-Protocol Label Switching (MPLS) service node 313. Optical interface 316 is coupled to IP service node 302, ATM service node 304, frame relay service node 306, Ethernet service node 308, telephony service node 310, SAN service node 312, and MPLS service node 314. Optical interface 315 is coupled to optical interface 316 over working links 321 and over protect links 322. Links 321-322 could be configured in a ring, mesh, hybrid, or some other configuration.

Under normal operating conditions, optical interfaces 315-316 make connections to connect respective service nodes 301-302, 303-304, 305-306, 307-308, 309-310, 311-312, and 313-314 over working links 321. Note that working links may be fully loaded—for example—to an 80% cap. If one of working links 321 exhibits inadequate performance, then optical interfaces 315-316 make connections to replace the inadequate working link with one of protect links 322. Thus, multiple service nodes, including IP service nodes, may share a pool of protect links.

ADVANTAGES

The invention can reduce the number of links required between matched pairs of IP routers. Fewer links are needed because the working links can be loaded to 80% or more. A pool of protect links is available and is shared among multiple services. The use of shared protect links is more efficient than providing a protect link for each working link.

For example, a prior art IP system may require 100 links that each has a 40% load. Using the invention, a new IP system may only require 50 links at an 80% load—and access to the shared pool of protect links. The reduction in total links represents a cost savings to the communication system.

The invention claimed is:
1. A communication system comprising:
   an first Internet Protocol (IP) service node and a second IP service node;
   a first telephony service node and a second telephony service node;
   a first optical interface and a second optical interface wherein the first optical interface is coupled to the first IP service node and the first telephony service node and the second optical interface is coupled to the second IP service node and the second telephony service node;
   a first working link coupling the first optical interface to the second optical interface and configured to transfer IP traffic between the first IP service node and the second IP service node;
   a second working link coupling the first optical interface to the second optical interface and configured to transfer telephony traffic between the first telephony service node and the second telephony service node; and
   a shared protect link coupling the first optical interface to the second optical interface and configured to transfer IP traffic between the first IP service node and the second IP service node or to transfer telephony traffic between the first telephony service node and the second telephony service node, wherein the first optical interface and the second optical interface are configured to replace either of the first working link or the second working link with the shared protect link.
2. The communication system of claim 1 further comprising:
   a first Asynchronous Transfer Mode (ATM) service node and a second ATM service node wherein the first optical interface is coupled to the first ATM service node and the second optical interface is coupled to the second ATM service node; and a third working link coupling the first optical interface to the second optical interface and configured to transfer ATM traffic between the first ATM service node and the second ATM service node, wherein the first optical interface and the second optical interface are configured to replace the third working link with the shared protect link.

3. The communication system of claim 1 further comprising:

a first Ethernet service node and a second Ethernet service node wherein the first optical interface is coupled to the first Ethernet service node and the second optical interface is coupled to the second Ethernet service node; and a third working link coupling the first optical interface to the second optical interface and configured to transfer Ethernet traffic between the first Ethernet service node and the second Ethernet service node, wherein the first optical interface and the second optical interface are configured to replace the third working link with the shared protect link.

4. The communication system of claim 1 further comprising:

a first frame relay service node and a second frame relay service node wherein the first optical interface is coupled to the first frame relay service node and the second optical interface is coupled to the second frame relay service node; and a third working link coupling the first optical interface to the second optical interface and configured to transfer frame relay traffic between the first frame relay service node and the second frame relay service node, wherein the first optical interface and the second optical interface are configured to replace the third working link with the shared protect link.

5. The communication system of claim 1 further comprising:

a first Storage Area Network (SAN) service node and a second SAN service node wherein the first optical interface is coupled to the first SAN service node and the second optical interface is coupled to the second SAN service node; and a third working link coupling the first optical interface to the second optical interface and configured to transfer SAN traffic between the first SAN service node and the second SAN service node, wherein the first optical interface and the second optical interface are configured to replace the third working link with the shared protect link.

6. The communication system of claim 1 further comprising:

a first Multi-Protocol Label Switching (MPLS) service node and a second MPLS service node wherein the first optical interface is coupled to the first MPLS service node and the second optical interface is coupled to the second MPLS service node; and a third working link coupling the first optical interface to the second optical interface and configured to transfer MPLS traffic between the first MPLS service node and the second MPLS service node, wherein the first optical interface and the second optical interface are configured to replace the third working link with the shared protect link.

7. The communication system of claim 1 wherein the first IP service node comprises a first matched IP router pair and the second IP service node comprises a second matched IP router pair.

8. A communication system comprising:

a first Internet Protocol (IP) router and a second IP router wherein the first IP router and the second IP router back-up each other to form a first matched IP router pair;

a third IP router and a fourth IP router wherein the third IP router and the fourth IP router back-up each other to form a second matched IP router pair;

a first optical interface and a second optical interface;

a first working link coupling the first IP router to the first optical interface, a second working link coupling the second IP router to the first optical interface, a third working link coupling the third IP router to the second optical interface, and a fourth working link coupling the fourth IP router to the second optical interface;

a fifth working link coupling the first optical interface to the second optical interface, wherein under normal operation, the first optical interface connects the first working link to the fifth working link and the second optical interface connects the fifth working link to the third working link to form a first working communication path from the first IP router to the third IP router;

a sixth working link coupling the first optical interface to the second optical interface, wherein under normal operation, the first optical interface connects the second working link to the sixth working link and the second optical interface connects the sixth working link to the fourth working link to form a second working communication path from the second IP router to the fourth IP router;

a first protect link coupling the first IP router to the first optical interface, a second protect link coupling the second IP router to the first optical interface, a third protect link coupling the third IP router to the second optical interface, and a fourth protect link coupling the fourth IP router to the second optical interface;

a fifth protect link coupling the first optical interface to the second optical interface, wherein under a first back-up operation, the first optical interface connects the first working link or the first protect link to the fifth protect link and the second optical interface connects the fifth protect link to the third working link or the third protect link to form a first protect communication path from the first IP router to the third IP router;

a sixth protect link coupling the first optical interface to the second optical interface, wherein under a second back-up operation, the first optical interface connects the second working link or the second protect link to the sixth protect link and the second optical interface connects the sixth protect link to the fourth working link or the fourth protect link to form a second protect communication path from the second IP router to the fourth IP router;

wherein under a third back-up operation, the first optical interface connects a first non-IP service link to the fifth protect link and the second optical interface connects the fifth protect link to a second non-IP service link to form a third protect communication path for a non-IP service; and wherein under a fourth back-up operation, the first optical interface connects a third non-IP service link to the sixth protect link and the second optical interface connects the sixth protect link to a fourth non-IP service link to form a fourth protect communication path for a the non-IP service.

9. The communication service of claim 8 wherein the non-IP service comprises telephony service.

10. The communication service of claim 8 wherein the non-IP service comprises asynchronous transfer mode service.

11. The communication service of claim 8 wherein the non-IP service comprises frame relay service.

12. The communication service of claim 8 wherein the non-IP service comprises Ethernet service.

13. The communication service of claim 8 wherein the non-IP service comprises storage area network service.

14. The communication service of claim 8 wherein the non-IP service comprises multi-protocol label switching service.

* * * * *